3,357,786
PROCESS FOR THE PRODUCTION OF HIGH-
LY PURE SEMI-CONDUCTING SELENIUM
MATERIALS
Hanswalter Giesekus, Cologne-Stammheim, and Hilla
Schnöring, Wuppertal-Elberfeld, Germany, assignors to
Farbenfabriken Bayer Aktiengesellschaft, Leverkusen,
Germany, a German corporation
Filed Sept. 23, 1963, Ser. No. 310,623
Claims priority, application Germany, Oct. 9, 1962,
F 37,996
9 Claims. (Cl. 23—50)

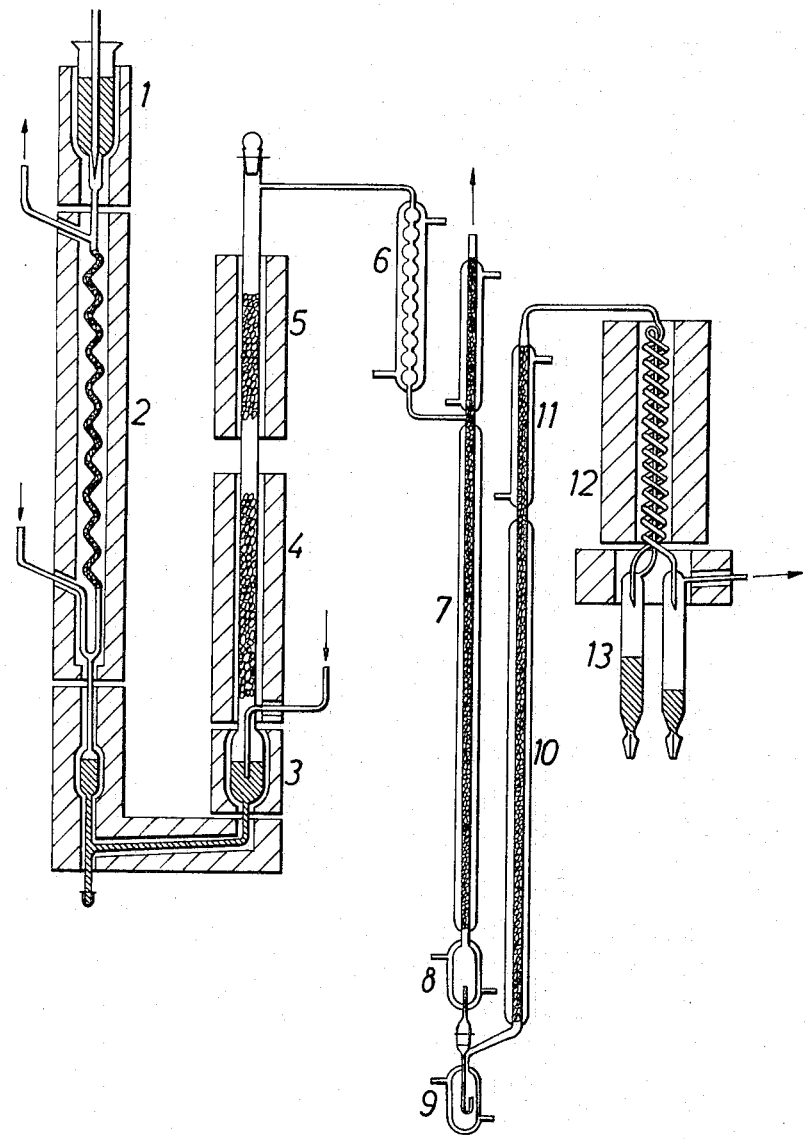

ABSTRACT OF THE DISCLOSURE

Continuous process for producing highly pure semi-conducting selenium and metal selenides by contacting liquefied crude selenium with hydrogen to hydrogenate impurities and partially purify the crude selenium; converting the partially purified selenium to gaseous hydrogen selenide by reaction with hydrogen; separating the hydrogen selenide from unreacted hydrogen and gaseous impurities by liquefaction; and converting the liquid hydrogen selenide to pure semi-conducting selenium material such as by thermally decomposing the hydrogen selenide, or by reacting the hydrogen selenide with pure metal vapor or with aqueous metal salt solution to produce metal selenide.

---

The invention relates to a process for the production of highly pure semi-conducting selenium materials—selenium or metal selenides—by conversion of crude salts into hydrogen selenide with subsequent thermal decomposition or reaction with pure metals or metal compounds.

When using selenium or metal selenides as semi-conductors, e.g., in rectifiers, photoelements or photoresistances, the purity of the material used is exceptionally important and accordingly many processes have been developed for the purification or the preparation thereof in pure form. There have been developed multi-stage distillation processes (e.g., H. W. Henkels, Journal Applied Physics, 21, 1950, 725), wet processes, e.g., A. Voigt and H. Krebs, British patent specification No. 698,228 and purification processes involving sublimation (e.g., L. M. Nijland, Phillips Research Reports 9, 1954, 259).

With ultra-high standards of purity, however, it is not possible successfully to remove all impurities by one of these processes without repetition or without the considerable expense of a process involving many stages.

The production of highly pure selenium or highly pure metal selenides involving the conversion to hydrogen selenide proceeds more favourably. Such a process has been developed by S. Nielsen and R. J. Heritage, J. Electrochemical Soc. 106, 1959, pages 39–43. This process however, has the disadvantage that it cannot be operated continuously, but takes place in three steps carried out successively in different stages:

(1) Separation of readily hydrolysable impurities (initial purification), (2) Production, purification and solidification of hydrogen selenide, (3) Re-evaporation of the hydrogen selenide and thermal decomposition to elementary selenium and hydrogen, or reaction with initially purified metals or metal compounds to the corresponding metal selenide.

The present invention provides a continuously operating process for the production of highly pure selenium or highly pure metal selenides involving the conversion of crude selenium into hydrogen selenide wherein liquefied selenium is brought, over the largest possible surface, into contact with hydrogen, the finely divided selenium thus initially purified is converted, at temperatures below 700° C. by reaction with hydrogen into hydrogen selenide which is continuously separated from unconverted hydrogen and gaseous impurities and is thermally decomposed to selenium or reacted with pure metals or metal compounds to form the corresponding selenides.

This process has the advantages that:

(1) The preliminary purification and the hydrogenation of the selenium are carried out simultaneously in two stages arranged one after the other and, (2) The hydrogen selenide is not solidified, but is separated as a liquid from readily boiling substances and, possibly, is further rectified continuously in a column.

This process has not only the generally known advantages of continuous processes, but in addition has a very great purification effect, because of the self-cleaning of the apparatus during the continuous operation and because of the rectification step which is connected with the liquefaction and re-evaporation; the advantage of the new process cannot be effected by simple solidification and re-evaporation of hydrogen selenide.

Finally, the process has the further advantage of increased safety in operation, since at no stage in this process are large quantities of the toxic hydrogen selenide accumulated, but the hydrogen selenide is constantly broken down into its elements or converted into safe compounds.

The process according to the present invention can, for example, be carried out in the following manner in an apparatus of which the details can be seen from the accompanying drawing.

The crude selenium is liquefied in a supply vessel 1 and passes through a bottom opening at a uniform speed, which can be regulated if desired, into the preliminary purification tube 2 which is a zig-zag tube containing filler bodies. In this tube, hydrogen flows, at a temperature of about 550° C., in counter-current to the selenium which flows downwards in a thin film with a constantly reforming surface, and impurities which can easily be hydrogenated (e.g., halogens and sulphur) are substantially separated, whereas the selenium is not hydrogenated.

The hydrogen charged with gaseous hydrides leaves the preliminary purification tube and, after passing through a washing or scrubbing section, in which most of the toxic hydrides are converted, is discharged. The partially purified selenium enters an evaporation vessel 3, into which pure dry hydrogen is introduced. In the vapour chamber and in the reaction chamber 4 situated above it, in which the selenium exists in a very finely divided form because of partial condensation on the greatly enlarged surface (e.g., filler bodies or a double coil), the selenium is hydrogenated at temperatures from 650 to 685° C., while all non-volatile impurities which cannot be hydrogenated remain in the liquid selenium. Following the reaction zone is a hot zone 5 which is at a temperature of about 300° C. and in which any readily-decomposable trace hydrides which are possibly formed (e.g., hydrogen telluride, phosphide or arsenide) are again decomposed.

Then follows a cooling section 6, the temperature of which is just above the boiling point of hydrogen selenide (i.e., at about −40° C.), and in which entrained dust, traces of water, mercury and hydrides of higher boiling point are retained. The hydrogen selenide then passes into a two-stage rectifier column, in the first stage 7 of which it is liquefied by cooling to about −60° C. and rectified with respect to hydrides of lower boiling point, which discharge, together with unreacted hydrogen, through the top. The liquid hydrogen selenide which collects in the sump 8 travels, by way of an immersion trap, into the sump 9 of the second stage 10, thus sump 9 acts as an evaporator, and the hydrogen selenide is discharged through the top 11 whereas traces of impurities which are more difficult to evaporate are concentrated in the sump.

The reconversion of hydrogen selenide into its elements takes place, in the decomposition tower 12 at a temperature of about 1000° C., to the extent of about 75% in the presence of excess hydrogen. The selenium is liquefied by rapid discharge from the hot zone and drops into a collecting vessel 13 in which it solidifies and is removed at intervals by means of a suitable discharge device, it being possible, if desired, simultaneously to granulate it. Unreacted hydrogen selenide passes once more, with the liberated hydrogen, through the decomposition tower, more selenium being collected in a second collecting vessel. The residual gas is discharged through a scrubber, in which, particularly, the hydrogen selenide still present is transformed (e.g., by treatment with hydrogen peroxide in alkaline solution) into selenium or even into a selenide.

If the decomposition tower is replaced by a reaction vessel of suitable form and if the vapour of a previously purified metal (e.g., cadmium) is caused to enter this vessel in addition to the purified hydrogen selenide, a highly pure metal selenide is formed at suitable temperature. The same result is obtained by introducing the purified hydrogen selenide into an aqueous solution of a pure metal salt (e.g., cadmium sulphate). The former and the latter processes can be combined by thermally decomposing most of the purified hydrogen selenide or reacting it with a metal in the vapour phase, while the unreacted residue is converted in aqueous solution into metal selenide.

By the aforesaid methods, e.g., selenides of the metals Cu, Ag, Au, Zn, Cd, Hg, Be, Mg, Ca, Sr, Ba, Al, Ga, In, Sn, Pb, As, Sb, Fe or mixed selenides of said metals can be easily prepared with high purity and very different semi-conducting properties.

All the parts of the apparatus as described are preferably made of quartz, it being possible for ground joints to be sealed off with selenium.

Highly pure products are obtained in the process set out above. With selenium and cadmium selenide, the purity is considerably greater than that of the purest known products: it was not possible to detect impurity, either by spectroscopic analysis or by other micro-analytic methods.

We claim:

1. Continuous process for the production of highly pure semi-conducting materials selected from the group consisting of selenium and metal selenide which comprises
   (I) contacting liquefied crude selenium in countercurrent flow with hydrogen under conditions of high surface exchange at a temperature below the formation temperature of hydrogen selenide yet sufficient to hydrogenate hydrogenatable impurities present to purify partially such crude selenium;
   (II) converting the partially purified selenium to gaseous hydrogen selenide by reaction with hydrogen at a hydrogen selenide formation temperature below 700° C.;
   (III) separating the hydrogen selenide from readily decomposable trace hydrides by decomposing such trace hydrides at a treatment temperature of about 300° C.;
   (IV) separating the hydrogen selenide from entrained impurities including hydrides of a higher boiling point than hydrogen selenide by cooling to a deposition temperature just above the boiling point of hydrogen selenide;
   (V) separating the hydrogen selenide from unreacted hydrogen and gaseous impurities of lower boiling point than hydrogen selenide by liquefaction; and
   (VI) converting the liquid hydrogen selenide resulting from the liquefaction step to pure semi-conducting selenium material.

2. Process according to claim 1 wherein the liquid hydrogen selenide is subjected after liquefaction to a rectification, such that the more readily volatile impurities are first separated out and the more difficultly volatile impurities are thereafter separated out.

3. Process according to claim 2 wherein the resulting hydrogen selenide is converted to pure selenium by thermal decomposition.

4. Process according to claim 2 wherein the resulting hydrogen selenide is converted to pure metal selenide by reaction with a pure corresponding metal vapor.

5. Process according to claim 4 wherein the resulting hydrogen selenide is converted to pure cadmium selenide by reaction with cadmium vapor.

6. Process according to claim 2 wherein the resulting hydrogen selenide is converted to pure metal selenide by reaction with an aqueous solution of a corresponding metal salt.

7. Process according to claim 6 wherein the hydrogen selenide is converted to pure cadmium selenide by reaction with an aqueous solution of a cadmium salt.

8. Process according to claim 2 wherein most of the resulting hydrogen selenide is converted to pure selenium by thermal decomposition while the unreacted residue of such hydrogen selenide is reacted with a metal salt in an aqueous solution to form the corresponding highly pure metal selenide.

9. Process according to claim 2 wherein most of the resulting hydrogen selenide is converted to pure metal selenide by reaction with a pure corresponding metal vapor while the unreacted residue of such hydrogen selenide is reacted with a metal salt in an aqueous solution to form the corresponding highly pure metal selenide.

References Cited

UNITED STATES PATENTS 3,006,720   10/1961   L'Heureux _____ 23—50

FOREIGN PATENTS 540,215   4/1957   Canada.
608,080   9/1948   Great Britain.

OTHER REFERENCES

Nielsen et al.: Journal of the Electrochemical Society, vol. 106, January 1959, pp. 39–43.

OSCAR R. VERTIZ, *Primary Examiner.*

EARL C. THOMAS, *Examiner.*

H. T. CARTER, *Assistant Examiner.*